United States Patent
Watari

(10) Patent No.: US 10,303,687 B2
(45) Date of Patent: May 28, 2019

(54) CONCURRENT PROCESSING OF DATA SOURCES

(71) Applicant: Parallel Universe, Inc., Arlington, MA (US)

(72) Inventor: Hiromichi Watari, Arlington, MA (US)

(73) Assignee: Parallel Universe, Inc., Arlington, MA (US)

( * ) Notice: Subject to any disclaimer, the term of this patent is extended or adjusted under 35 U.S.C. 154(b) by 238 days.

(21) Appl. No.: 15/254,094

(22) Filed: Sep. 1, 2016

(65) Prior Publication Data

US 2018/0060391 A1    Mar. 1, 2018

(51) Int. Cl.
*G06F 17/30* (2006.01)
*G06F 16/2453* (2019.01)

(52) U.S. Cl.
CPC .. *G06F 16/24542* (2019.01); *G06F 16/24539* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 4,870,568 A | 9/1989 | Kahle et al. | |
| 5,367,675 A | 11/1994 | Cheng et al. | |
| 6,546,381 B1 | 4/2003 | Subramanian et al. | |
| 7,010,521 B2 | 3/2006 | Hinshaw et al. | |
| 8,244,715 B2 | 8/2012 | Cole et al. | |
| 8,706,973 B2 | 4/2014 | Lee et al. | |
| 9,378,246 B2 | 6/2016 | Watari | |
| 9,805,080 B2* | 10/2017 | Joshi | G06F 3/04842 |
| 2002/0023069 A1 | 2/2002 | Blank et al. | |
| 2003/0229640 A1 | 12/2003 | Carlson et al. | |
| 2005/0278152 A1* | 12/2005 | Blaszczak | G06F 16/283 703/1 |
| 2006/0212429 A1* | 9/2006 | Bruno | G06F 16/24578 |
| 2011/0047144 A1 | 2/2011 | Han et al. | |

OTHER PUBLICATIONS

Krikellas et al., "Multithreaded Query Execution on Multicore Processors", Very Large Data Base '09, Aug. 24-28, 2009, Lyon, France.

* cited by examiner

*Primary Examiner* — Sana A Al-Hashemi
(74) *Attorney, Agent, or Firm* — Finch & Maloney PLLC

(57) ABSTRACT

A pattern matching component is provided. The pattern matching component utilizes a plurality of processors to efficiently identify and retrieve information from a plurality of data sources. In some examples, the pattern matching component concurrently executes multiple portions of a data access plan, such as a query execution plan, using a plurality of processors disposed within a multi-core processor. The pattern matching component may concurrently execute multiple portions of the data access plan using a plurality of processors in a distributed system. Concurrent execution of at least some of the operations required to identify and retrieve the information results in increased efficiency over conventional query execution methods.

14 Claims, 8 Drawing Sheets

CONCURRENT PROCESSING OF DATA SOURCES

BACKGROUND

Technical Field

The technical field relates generally to data processing and, more particularly, to concurrent processing of discrete data sources.

Background Discussion

Conventional data storage and management systems, such as relational database management systems, manage disparate sets of information by consolidating comparable elements into relatively homogeneous tables linked by associations. To reduce data redundancy, many databases employ highly normalized schemas that result in a large numbers of individual tables.

To identify patterns within, and retrieve data from, a database structured according to a normalized schema, database engines are often required to operate on sets of data that include a large number of individual records. To increase efficiency during these operations, many database engines build query execution plans prior to executing data retrieval queries. In building these query execution plans, database engines determine the tables and data conditions required by a submitted query and, based on this information, determine an order in which to access the tables and the access methods to be used. After the query execution plan is complete, conventional database engines execute the query execution plan to retrieve requested data.

SUMMARY

In at least one embodiment, a computer system configured to access related and distributed data is provided. The computer system includes a memory and at least one processor coupled to the memory. The memory includes at least one relational database including at least one first table; a query execution plan identifying the at least one first table; and at least one first buffer. The at least one processor is configured to execute the query execution plan at least in part by executing a first thread concurrently with a second thread; retrieving, via the first thread, first data from the at least one first table; retrieving, via the second thread, second data from the at least one first table; storing, via the first thread, the first data in the at least one first buffer; and storing, via the second thread, the second data in the at least one first buffer.

In the computer system, the at least one processor may be configured to provide a result from execution of the query execution plan to a component that generated the query execution plan. The at least one processor may be further configured to execute the query execution plan at least in part by identifying, via the first thread and the second thread, records that meet at least one condition associated with the at least one first table and retrieving, via the first thread and the second thread, the first data and the second data from the records. The memory may further include at least one second buffer, the relational database further include at least one second table, and the at least one processor may be further configured to execute the query execution plan at least in part by executing a third thread concurrently with a fourth thread; retrieving, from the at least one second table via the third thread, first records that meet at least one condition evaluated using third data stored in the at least one first buffer; retrieving, from the at least one second table via the fourth thread, second records that meet at least one condition evaluated using fourth data stored in the at least one first buffer; storing, via the third thread, data from the first records in the at least one second buffer; and storing, via the fourth thread, data from the second records in the at least one second buffer, the first records being stored at a different location within the at least one first buffer from the second records.

In the computer system, the at least one processor may include a first processing core and a second processing core within a multi-core processor. The first processing core may be configured to execute the first thread concurrently with the second thread and the second processing core may be configured to execute the third thread concurrently with the fourth thread. The at least one processor may be further configured to execute the query execution plan at least in part by retrieving, via the third thread, the third data from the at least one first buffer in a round-robin fashion and retrieving, via the fourth thread, the fourth data from the at least one first buffer in a round-robin fashion. The at least one processor may be further configured to execute the query execution plan at least in part by parsing the query execution plan to identify an order of processing indicating the at least one first table be processed prior to the at least one second table.

In another embodiment, a data access method is provided. The data access method is executed by a computer system. The computer system includes at least one processor. The data access method includes acts of executing a first thread concurrently with a second thread; retrieving, via the first thread, first data from at least one first table in a relational database; retrieving, via the second thread, second data from the at least one first table; storing, via the first thread, the first data in at least one first buffer; and storing, via the second thread, the second data in the at least one first buffer.

The method may further include acts of identifying, via the first thread and the second thread, records that meet at least one condition associated with the at least one first table; and retrieving, via the first thread and the second thread, the first data and the second data from the records. The method may further include acts of executing a third thread concurrently with a fourth thread; retrieving, from at least one second table in the relational database via the third thread, first records that meet at least one condition evaluated using third data stored in the at least one first buffer; retrieving, via the fourth thread, second records from the at least one second table that meet at least one condition evaluated using fourth data stored in the at least one first buffer; storing, via the third thread, data from the first records in at least one second buffer; and storing, via the fourth thread, data from the second records in the at least one second buffer, the first records being stored at a different location within the at least one first buffer from the second records. The method may further include acts of retrieving, via the third thread, the third data from the at least one first buffer in a round-robin fashion; and retrieving, via the fourth thread, the fourth data from the at least one first buffer in a round-robin fashion. The method may further include an act of parsing a query execution plan to identify an order of processing indicating the at least one first table be processed prior to the at least one second table. The method may further include an act of providing a result from execution of the query execution plan to a component that generated the query execution plan.

In another embodiment, a non-transitory computer readable medium is provided. The computer readable medium has a program stored therein configured to access related and distributed data. The program is executable by a computer system including at least one processor and at least one buffer. The program includes instructions configured to execute a first thread concurrently with a second thread; instructions configured to retrieve, via the first thread, first data from at least one first table in a relational database; instructions configured to retrieve, via the second thread, second data from the at least one first table; instructions configured to store, via the first thread, the first data in at least one first buffer; and instructions configured to store, via the second thread, the second data in the at least one first buffer.

The computer readable medium may further include instructions configured to identify, via the first thread and the second thread, records that meet at least one condition associated with the at least one first table; and instructions configured to retrieve, via the first thread and the second thread, the first data and the second data from the records. The computer readable medium may further include instructions configured to execute a third thread concurrently with a fourth thread; instructions configured to retrieve, from at least one second table in a relational database via the third thread, first records that meet at least one condition evaluated using third data stored in the at least one first buffer; instructions configured to retrieve, via the fourth thread, second records from the at least one second table that meet at least one condition evaluated using fourth data stored in the at least one first buffer; instructions configured to store, via the third thread, data from the first records in at least one second buffer; and instructions configured to store, via the fourth thread, data from the second records in the at least one second buffer, the first records being stored at a different location within the at least one first buffer from the second records.

In the computer readable medium, the program may be configured to execute the first thread concurrently with the second thread via a first processing core of a multi-core processor; and execute the third thread concurrently with the fourth thread via a second processing core of the multi-core processor. The computer readable medium may further include instructions configured to retrieve, via the third thread, the third data from the at least one first buffer in a round-robin fashion; and instructions configured to retrieve, via the fourth thread, the fourth data from the at least one first buffer in a round-robin fashion. The computer readable medium may further include instructions configured to parse a query execution plan to identify an order of processing indicating the at least one first table be processed prior to the at least one second table. The computer readable medium may further include instructions configured to provide a result from execution of the query execution plan to a component that generated the query execution plan.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
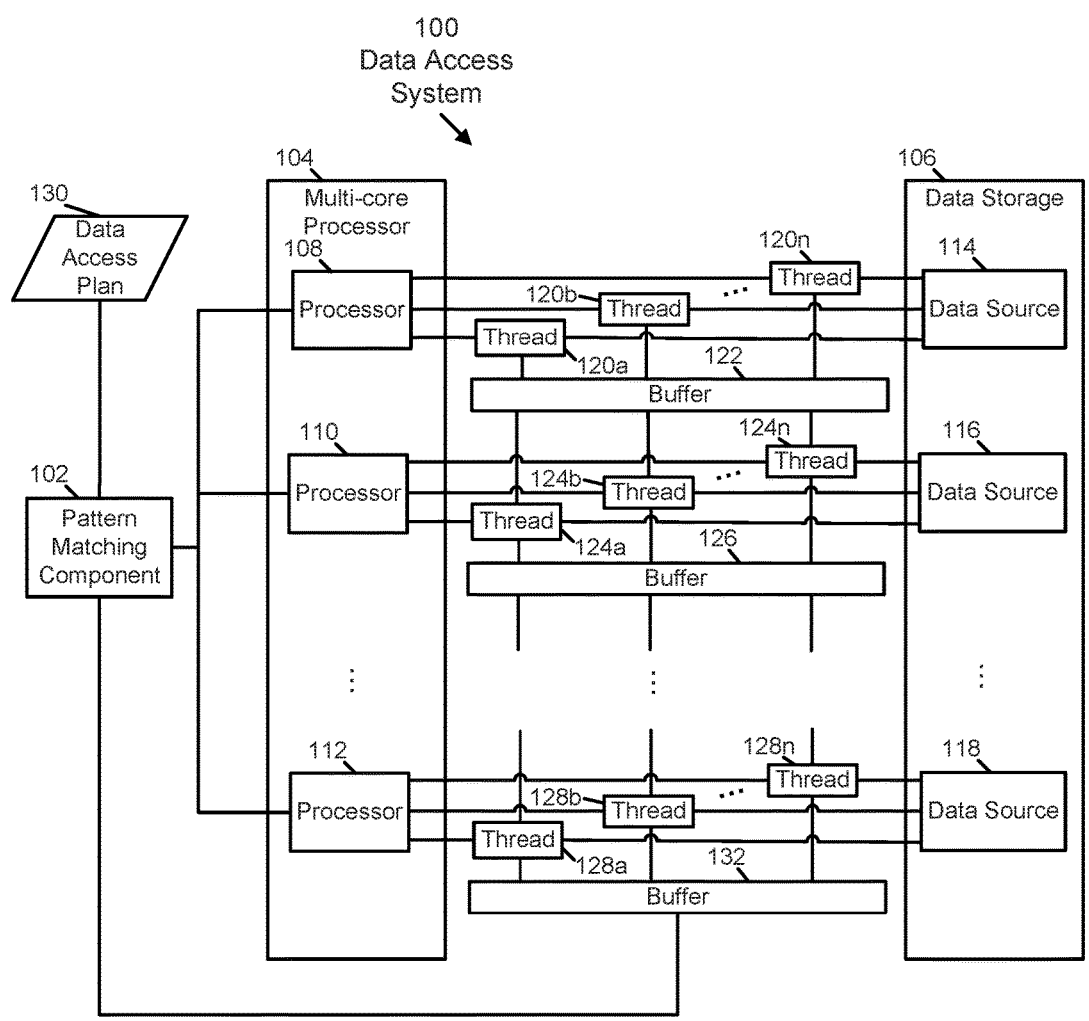
FIG. 1 is a block diagram illustrating logical and physical components of a data management system.

Various embodiments disclosed herein include a number of apparatuses and methods for identifying patterns within data that is distributed within a computer system and retrieving the identified data for further processing. For example, according to one embodiment, a pattern matching component, such as a query execution component, utilizes a plurality of processors to efficiently identify and retrieve information from a plurality of data sources. In this embodiment, the pattern matching component concurrently executes multiple portions of a data access plan, such as a query execution plan, using a plurality of processors disposed within a multi-core processor. In another embodiment, the pattern matching component concurrently executes multiple portions of the data access plan using a plurality of processors in a distributed system. Concurrent execution of at least some of the operations required to identify and retrieve the information results in increased efficiency over conventional query execution methods.

In another embodiment, where the data access plan includes instructions to access each record of a data source (i.e., perform a "full scan" of the data source), the pattern matching component executes an improved full scan method. This improved full scan method accesses much of the data required to execute the query in-place (i.e., without copying or moving the data to another storage location). By accessing the data in this manner, the improved full scan method completes full scans of data sources more efficiently than conventional full scan methods.

In another embodiment, the pattern matching component instantiates a plurality of threads to process individual data sources listed within a data access plan (e.g., one or more relational database tables listed in a query execution plan). By using multiple, concurrently processing threads, the pattern matching component is able to process the individual data sources more quickly, thereby speeding up the overall execution of the data access plan.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Data Access System

Various embodiments disclosed herein implement a data access system using one or more computer systems. As described further below, in at least one embodiment, the data access system retrieves data from a plurality of data sources using a plurality of threads implemented by a plurality of processors included within a multi-core processor. FIG. 1 illustrates an example data access system 100 in accord with these embodiments. As shown, FIG. 1 includes a pattern matching component 102, a multi-core processor 104, a data storage element 106, threads 120a, 120b, 120n, 124a, 124b, 124n, 128a, 128b, and 128n, buffers 122, 126, and 132 and a data access plan 130. The multi-core processor 104 may be any of a wide variety of commercially available multi-core processors such as the Adapteva Epiphany, the AMD Phenom II, the Azul Systems Vega 3, the Clearspeed CSX700, and the Intel Polaris. While the number of threads instantiated by each of the processors 108, 110, and 112 in this example is three, the embodiments disclosed herein are not limited to a particular number of threads. Each of the processors 108, 110, and 112 may instantiate any number of one or more threads in various examples. In addition, while in FIG. 1 threads are used to process data sources, other embodiments may replace one or more of the threads illustrated in FIG. 1 with one or more discrete, concurrently executing software processes. As defined herein, a "software process" refers to, in addition to its ordinary meaning, a series of instructions executed by a processor. A software process may initiate other software processes and/or may spawn one or more threads.

The data storage 106 and the physical media storing the buffers 122, 126, and 132 may include volatile and/or non-volatile (non-transitory) media. In addition, the data storage 106 and the buffers 122, 126, and 132 may include a variety of data structures and data elements that store information to be processed by the data access system 100. For instance, in at least one embodiment, the data sources 114, 116, and 118 are each a relational database table. However, embodiments are not limited to relational databases. Information within the data access system 100, including data within the data storage 106 or the buffers 122 and 126, may be stored in any logical construction capable of holding information on a computer readable medium including, among other structures, file systems, flat files, indexed files, hierarchical databases, relational databases or object oriented databases. In addition, although the example illustrated in FIG. 1 includes three discrete data sources 114, 116, and 118, embodiments are not limited to a particular number of data sources and may include more or less than three data sources.

In addition, although the example illustrated in FIG. 1 includes one multi-core processor 104, embodiments are not limited a single multi-core processor. The multi-core processor 104 may include a plurality of multi-core processors and/or single-core processors in a distributed system. Distributed systems are described further below with reference to FIG. 4.

As illustrated in FIG. 1, the pattern matching component 102 is configured to parse the data access plan 130 and, based on the contents of the data access plan 130, initiate execution of the threads 120a, 120b, 120n, 124a, 124b, 124n, 128a, 128b, and 128n via the processors 108, 110, and 112. The data access plan 130 may include information associating each data source with a set of information to be retrieved from records stored in the data source, an order in which the data sources are to be accessed, a manner in which each data source should be accessed, and discrete conditions used to identify records stored in each data source. As described further below, identified records hold information to be used in subsequent processing and may hold information to be included in the result set generated by execution of the data access plan.

To be properly evaluated, conditions associated with a data source may require information from other data sources identified in the data access plan. In these situations, the order of data sources described in the data access plan reflects this dependency, with data sources associated with dependent conditions falling after data sources with information upon which the conditions depend. In the example illustrated by FIG. 1, the data access plan specifies that the data source 114 be accessed first, the data source 116 be accessed second, and the data source 118 be accessed third.

In addition, according to the example of FIG. 1, the data access plan 130 specifies conditions associated with the data source 114 be evaluated independently of the other data sources. The example data access plan 130 also specifies the conditions associated with the data source 116 be evaluated with information retrieved from the data source 114 (i.e., information from records stored in the data source 114 that meet the conditions associated with the data source 114). The example data access plan 130 also specifies the conditions associated with the data source 118 be evaluated with information retrieved from the data source 114 (i.e., information from records stored in the data source 114 that meet the conditions associated with the data source 114) and information retrieved from the data source 116 (i.e., information from records stored in the data source 116 that meet the conditions associated with the data source 116).

In the illustrated embodiment of FIG. 1, the threads 120a, 120b, 120n, 124a, 124b, 124n, 128a, 128b, and 128n are configured to concurrently execute as follows. The threads 120a, 120b, and 120n access the data source 114 using an access method associated with the data source 114 in the data access plan 130. In this example, the data access plan 130 specifies that the data source 114 be accessed via an index. The threads 120a, 120b, and 120n use the index to identify records within the data source 114 that meet the conditions associated with the data source 114 and retrieve information specified in the data access plan 130 from the identified records. The threads 120a, 120b, and 120n store this retrieved information in the buffer 122.

More specifically, in some embodiments, each of the threads 120a, 120b, and 120n concurrently processes, as described above, a different subset of the records stored in the data source 114. The particular subset of records processed by any given thread may vary between examples, but in at least one example, threads 120a, 120b, and 120n process individual records within the data source 114 in a round-robin fashion. In this example, the thread 120a processes record numbers 1, n+1, 2n+1, etc.; thread 120b processes record numbers 2, n+2, 2n+2; etc. and thread 120n processes record numbers n, 2n, 3n, etc. In another example, each of the threads 120a, 120b, and 120n process a contiguous fraction of the records (e.g., 1/n) stored in the data source 114. In other examples, the threads 120a, 120b, and 120n may process other sets of records and embodiments disclosed herein are not limited to a particular association between threads and records.

Continuing the example of FIG. 1, each of the threads 124a, 124b, and 124n accesses a record set in the buffer 122 and accesses records in the data source 116 using the access method associated with the data source 116 in the data access plan 130. In this example, the data access plan 130 specifies that the data source 116 be accessed via a full scan. Each of the threads 124a, 124b, and 124n performs an improved full scan method as described below with reference to FIG. 8 to identify records within the data source 116 that meet the conditions associated with the data source 116. In addition, as part of this improved full scan method, each of the threads 124a, 124b, and 124n retrieves information specified in the data access plan 130 from the identified records and stores, in the buffer 126, this retrieved information in association with the information from the record set in the buffer 122 used to identify the records from the data source 116.

Figure 9:
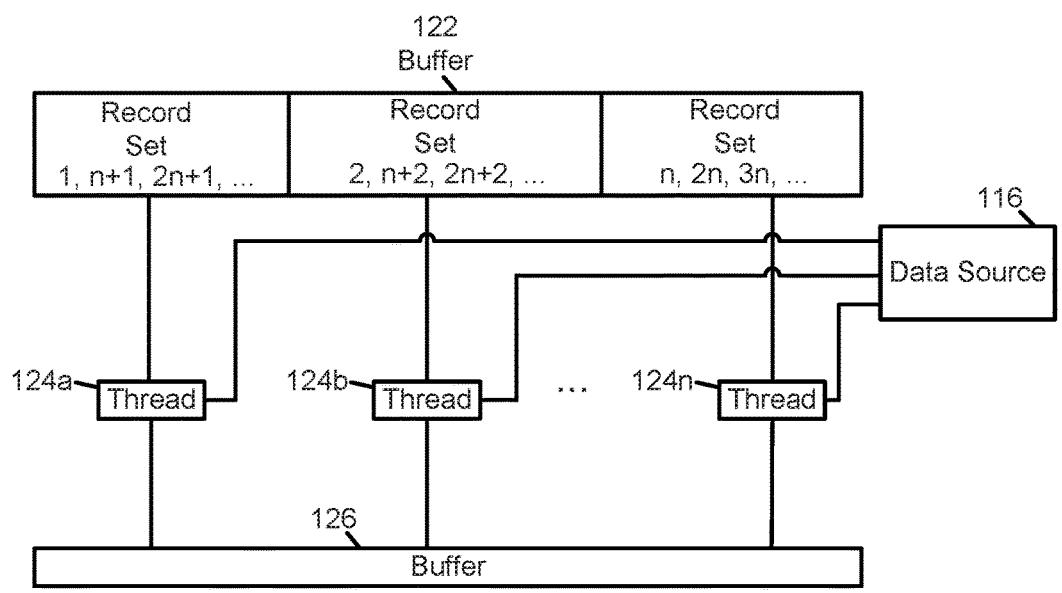
FIG. 9 is a block diagram depicting concurrent processing of a data source.

More specifically, in some embodiments, each of the threads 124a, 124b, and 124n concurrently processes, as described above, a different record set stored in the buffer 122. The particular record sets processed by any given thread may vary between examples, but in at least one example illustrated with more particularity in FIG. 9, threads 124a, 124b, and 124n process individual records in the buffer 122 in a round-robin fashion. In this example, the thread 124a processes a record set including record numbers 1, n+1, 2n+1, etc.; thread 124b processes a record set including record numbers 2, n+2, 2n+2; etc. and thread 124n processes a record set including record numbers n, 2n, 3n, etc. In another example, each of the threads 124a, 124b, and 124n processes a contiguous fraction of the records (e.g., 1/n) stored in the buffer 122. In other examples, the threads 124a, 124b, and 124n may process other record sets and embodiments disclosed herein are not limited to a particular association between threads and record sets.

Returning to FIG. 1, each of the threads 128a, 128b, and 128n accesses a record set in the buffer 126 and access the data source 118 using the access method associated with the data source 118 in the data access plan 130. In this example, the data access plan 130 specifies that the data source 118 be accessed via an index. Each of the threads 128a, 128b, and 128n uses the index and the information stored in its corresponding record set in a preceding buffer (e.g., the buffer 126) to identify records within the data source 118 that meet the conditions associated with the data source 118. Each of the threads 128a, 128b, and 128n retrieves information specified in the data access plan 130 from the identified records, and stores a result set in the buffer 132. These result sets include the information retrieved from the identified records of the data source 118 in association with the information from the preceding buffer used to identify the records.

More specifically, in some embodiments, each of the threads 128a, 128b, and 128n concurrently processes, as described above, a different record set stored in the preceding buffer. The particular record sets processed by any given thread may vary between examples, but in at least one example, threads 128a, 128b, and 128n process individual records in the preceding buffer in a round-robin fashion. In this example, the thread 128a processes record numbers 1, n+1, 2n+1, etc.; thread 128b processes record numbers 2, n+2, 2n+2; etc. and thread 128n processes record numbers n, 2n, 3n, etc. In another example, each of the threads 128a, 128b, and 128n processes a contiguous fraction of the records (e.g., 1/n) stored in the preceding buffer. In other examples, the threads 128a, 128b, and 128n may process other record sets and embodiments disclosed herein are not limited to a particular association between threads and record sets.

In the embodiment illustrated in FIG. 1, the pattern matching component 102 provides the result sets to a requesting component (e.g., a database engine or other software application) for subsequent processing. Other example methods performed by the pattern matching component 102 are described further below with reference to FIGS. 5-7.

Figure 2:
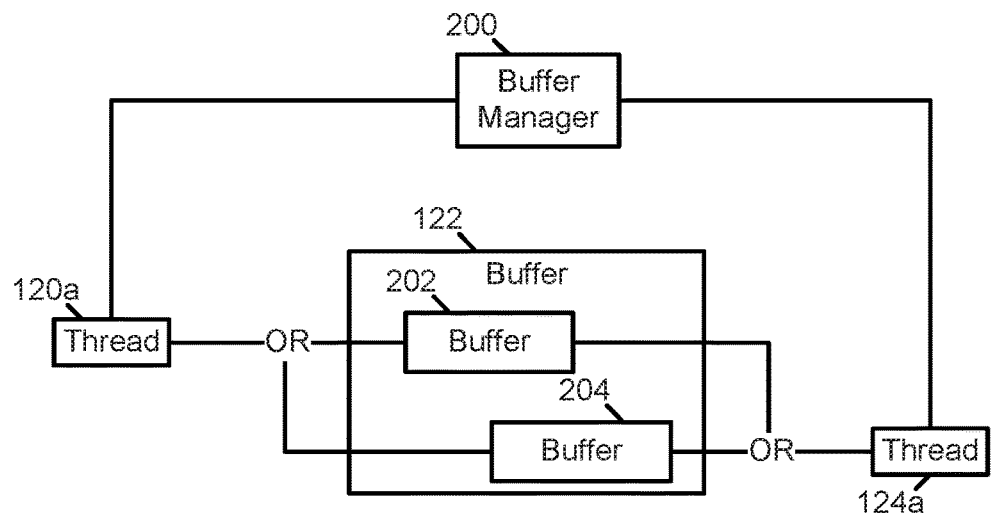
FIG. 2 is a block diagram showing threads, buffers, and record sets used in one example of the data management system.

In some embodiments, the buffers utilized by the data access system 100, such as the buffers 122, 126 and 132 are subdivided into a plurality of buffers that each store discrete copies of the data accessed by the threads executing within the data access system 100. FIG. 2 illustrates an example in which the buffer 122 is subdivided into two buffers 202 and 204 that are managed by a buffer manager 200. According to this example, the thread 120a writes information (e.g., a record set) to the buffer 202 and the thread 124a reads information (e.g., the record set) from the buffer 204. By utilizing separate buffers, each of the threads 120a and 124a are free to work with discrete copies of the same information, thereby reducing contention for buffering resources and increasing execution speed.

In some embodiments, the buffer manager 200 alternates buffer assignments in response to a request from a thread executing on the data access system 100. For instance, in one embodiment, the thread 120a writes information to the buffer 202 until the amount of information written equals a predetermined threshold (e.g., the storage capacity of the buffer 202 or an amount of storage allocated to store a record set with a particular number of records) or until the thread 120a has finished processing the data source 114. Responsive to the threshold being equaled or exceeded or to the completion of processing of the data source 114 by the thread 120a, the thread 120a issues a request to the buffer manager 200 for an empty buffer. Concurrent to the execution of the thread 120a, the thread 124a reads information from the buffer 204 until a threshold amount of information remains unread (e.g., no unread information). Responsive to this threshold being met, the thread 124a issues a request to the buffer manager 200 for a buffer filled with new data. Responsive to receipt of the request from the thread 120a and receipt of the request from the thread 124a, the buffer manager 200 reassigns the buffer 204 to the thread 120a and reassigns the buffer 202 to the thread 124a.

In some embodiments, the threads 120a, 120b, and 120n each write record sets to a separate, individual buffer, such as the buffer 202. In other embodiments, all of the threads 120a, 120b, and 120n write distinct record sets to the same buffer, such as the buffer 202. Similarly, in some embodiments, the threads 124a, 124b, and 124n each read record sets from a separate, individual buffer, such as the buffer 204. In other embodiments, all of the threads 124a, 124b, and 124n read distinct record sets from the same buffer, such as the buffer 204.

Figure 3:
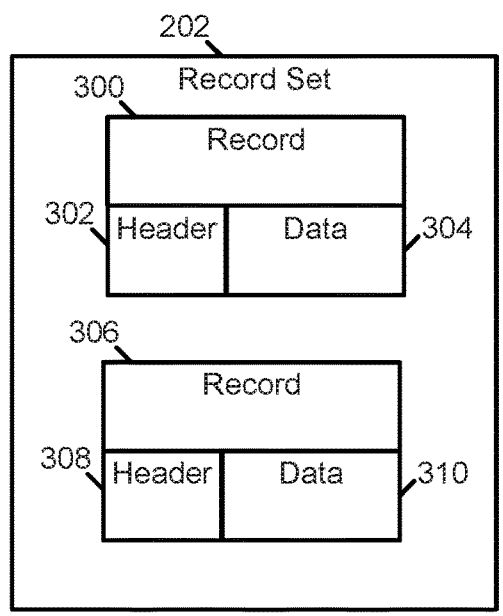
FIG. 3 is a block diagram depicting the data structure of an example record set used in a data management system.

In some embodiments, the threads 120a, 120b, 120n, 124a, 124b, 124n, 128a, 128b, and 128n store information in the buffer 122, the buffer 126, and the buffer 132 within a data structure organized to increase the speed with which the threads 124a, 124b, 124n, 128a, 128b, and 128n process records including variable length fields. FIG. 3 illustrates the buffer 122 organized according to one of these embodiments. As shown in FIG. 3, the buffer 122 includes a record set including two records 300 and 306. The record 300 includes a header 302 and data 304. The record 306 includes a header 308 and data 310. In the embodiment illustrated in FIG. 3, the headers 302 and 308 include location information that points directly to the beginning locations of each data field disposed within the data 304 and 310, respectively. By referencing the location information included in the headers 302 and 308, the threads 124a, 124b, and 124n can directly access each data field within the data 304 and 310. In this way, the threads 124a, 124b, and 124n are not required to sequentially scan the data 304 and 310 to find information needed for processing.

Information may flow between the components illustrated in FIGS. 1-3, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Embodiments disclosed herein are not limited to the particular configuration illustrated in FIGS. 1-3. Various embodiments may implement the components described above using a variety of hardware components, software components and combinations of hardware and software components. For example, in one embodiment the pattern matching component 102 may be implemented as a software component (e.g., a process or thread), while in another embodiment the pattern matching component 102 may be implemented as a hardware component (e.g., an application-specific integrated circuit). In addition, various embodiments may utilize additional components configured to perform the methods and functions described herein. For instance, in at least one embodiment, the data access system 100 is implemented using a computer system such as one of the computer systems described below with reference to FIG. 4.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
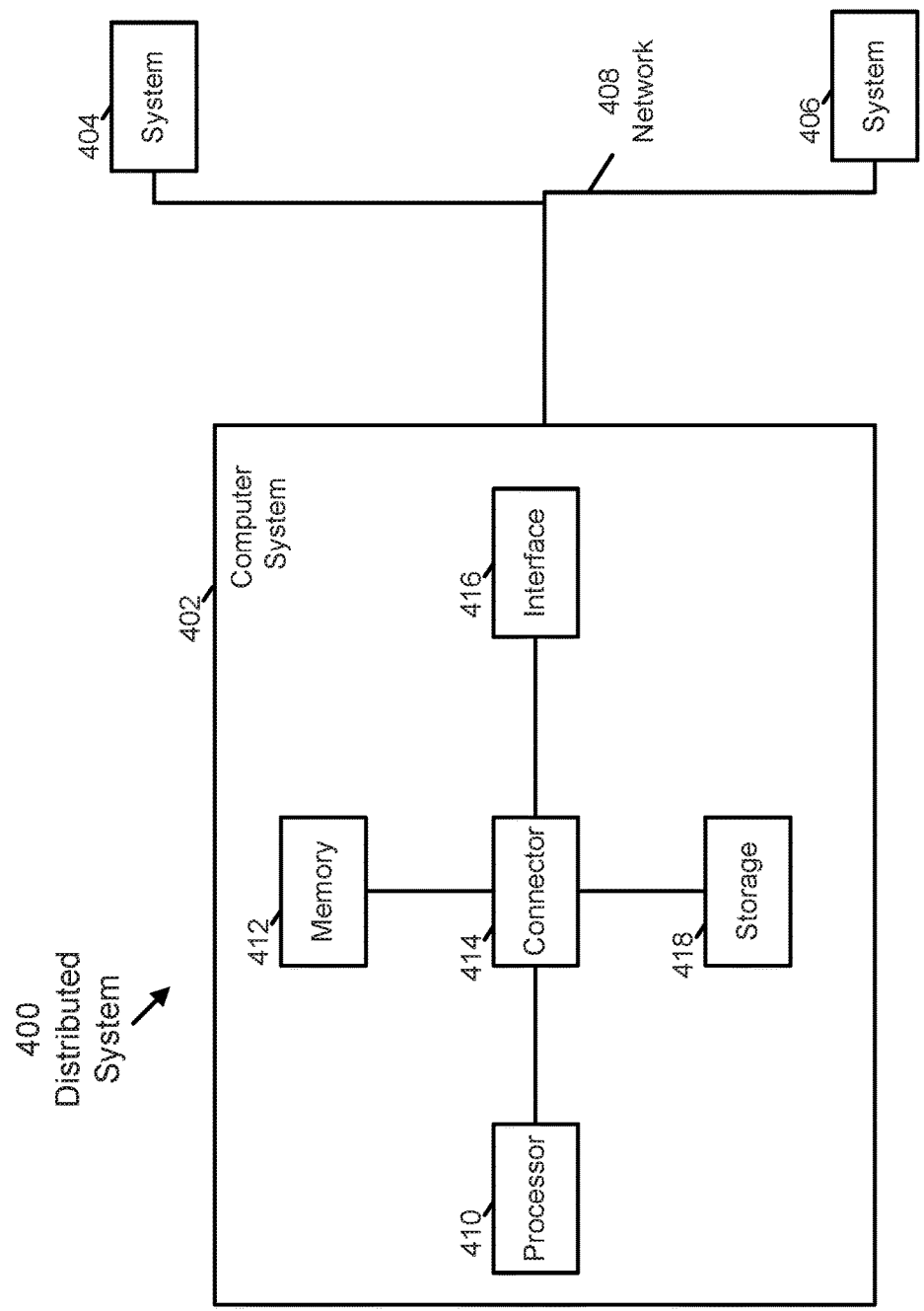
FIG. 4 is a schematic diagram of one example of a computer system that may perform methods and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. The network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, a connector 414, an interface 416 and data storage element 418. To implement at least some of the aspects, functions and methods disclosed herein, the processor 410 performs a series of instructions that result in manipulated data. The processor 410 may be any type of processor, multiprocessor or controller. Some example processors include commercially available processors such as an Intel Xeon, Itanium, Core, Celeron, or Pentium processor, an AMD Opteron processor, an Apple A5, a Sun UltraSPARC or IBM Power5+ processor and an IBM mainframe chip. The processor 410 is connected to other system components, including one or more memory devices 412, by the connector 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the connector 414. The connector 414 may include one or more physical busses, for example, busses between components that are integrated within a same machine, but may include any communication coupling between system elements including specialized or standard computing bus technologies such as IDE, SCSI, PCI and InfiniBand. The connector 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Data Access Methods

Figure 5:
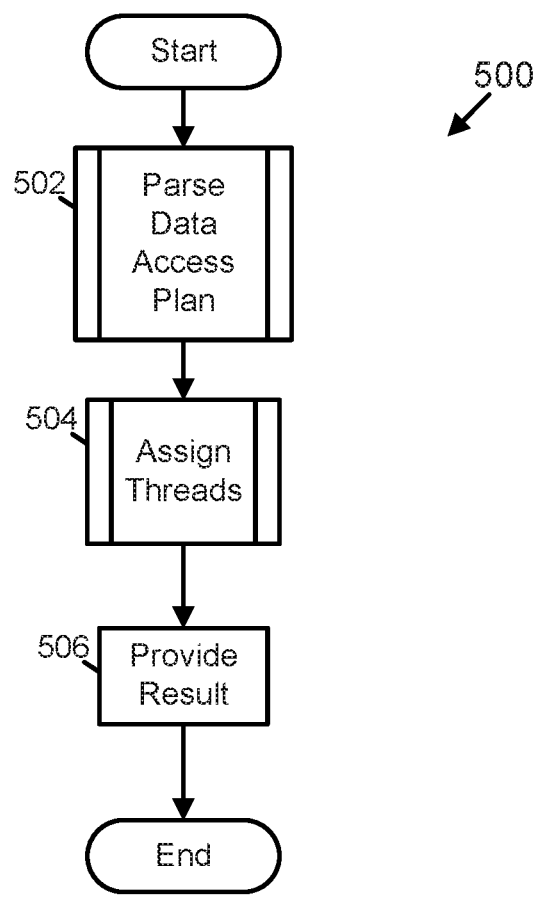
FIG. 5 is a flow diagram illustrating a method of identifying and retrieving data from a plurality of data sources.

As explained above, some embodiments execute methods that provide access to distributed information stored within a computer system, such as the data access system 100. One example of such a data access method is illustrated in FIG. 5. According to this example, the data access method 500 includes several acts of parsing a data access plan, executing a plurality of threads, and providing a result set.

Figure 6:
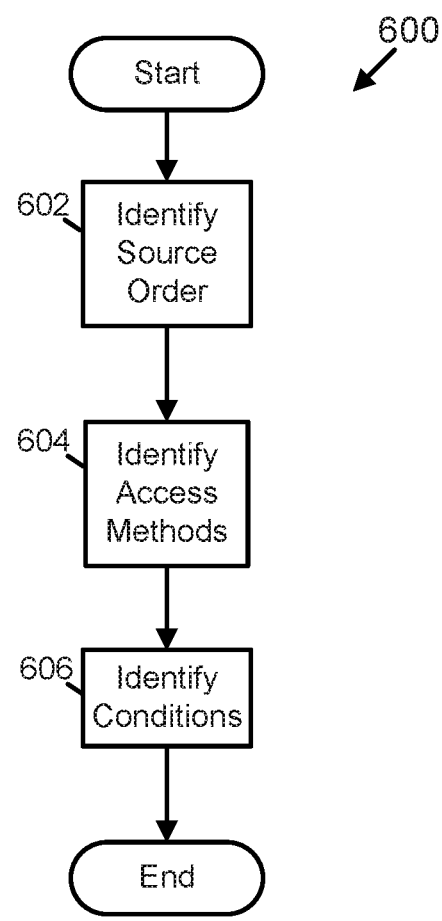
FIG. 6 is a flow diagram illustrating a method of parsing information from a data access plan.

In act 502, a data access plan, such as the data access plan 130 described above with reference to FIG. 1, is read. In one embodiment, a pattern matching component, such as the pattern matching component 102 described above with reference to FIG. 1, reads the data access plan. FIG. 6, which is described further below, illustrates an example method performed during execution of the act 502.

Figure 7:
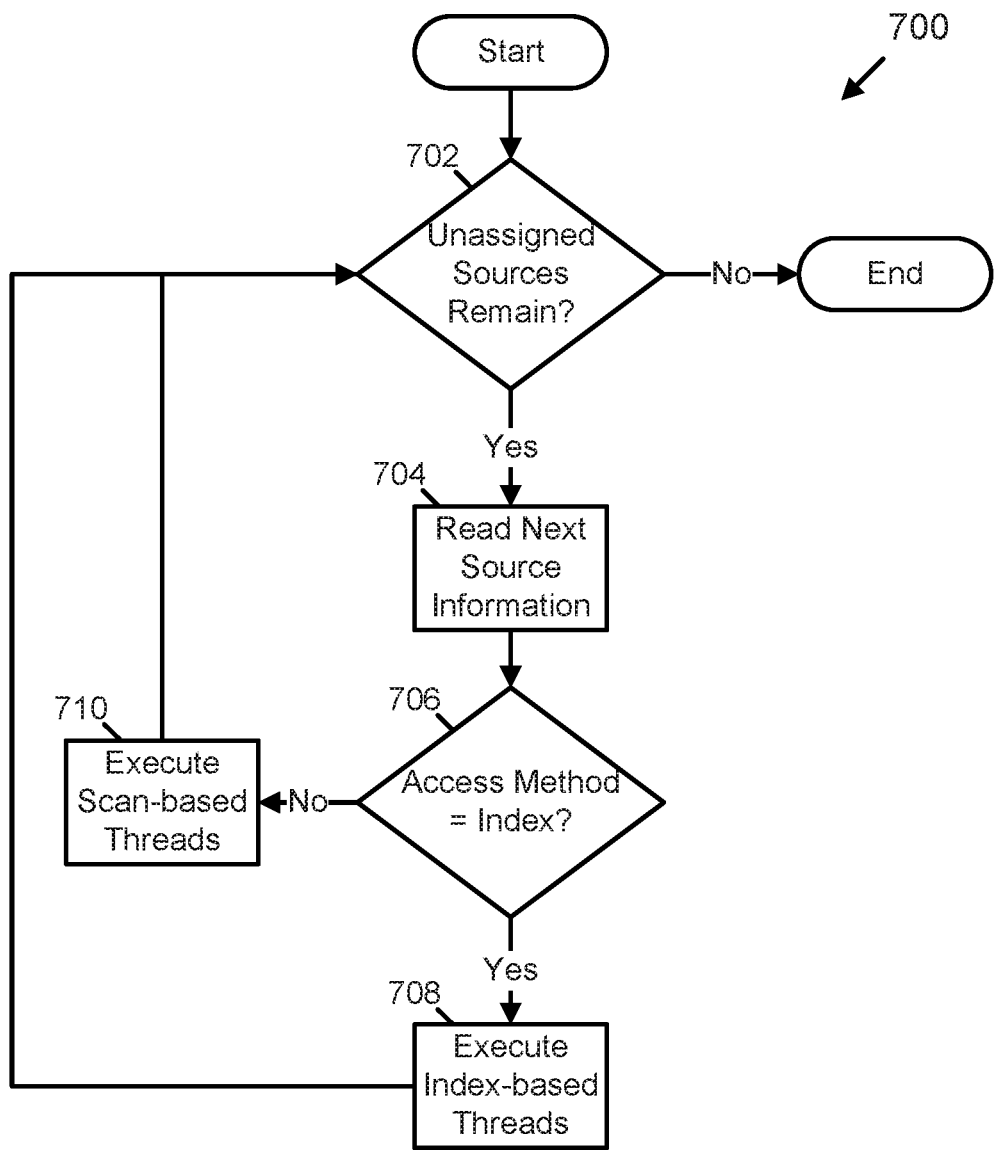
FIG. 7 is a flow diagram illustrating a method of executing threads that collaborate to identify and retrieve data requested in a query.

In act 504, a plurality of threads is instantiated and assigned to execute the data access plan. In one embodiment, the pattern matching component concurrently executes the plurality of threads. FIG. 7, which is described further below, illustrates an example method performed during execution of the act 504.

In act 506, a set of information resulting from execution of the data access plan is provided. In some embodiments, the pattern matching component provides the result set to the component that generated the data access plan. In one embodiment directed toward relational databases, the pattern matching component is a query execution component and provides the result set to a database engine which generated the data access plan. Upon completion of the act 506, the pattern matching component terminates the data access method 500.

Methods such as the data access method 500 enable faster identification and access to distributed data than conventional, single-threaded processes.

As described above with reference to the act 502, some embodiments perform methods that parse data access plans. One example of such a plan parsing method is illustrated in FIG. 6. According to this example, the plan parsing method 600 includes acts of identifying an order in which data sources are to be processed, identifying an access method to be used with each data source, and identifying conditions indicating records within a data source that are to be subject to subsequent processing.

In act 602, an order in which data sources are to be processed is identified. In one embodiment, a pattern matching component, such as the pattern matching component 102 described above with reference to FIG. 1, identifies the order contained within a data access plan, such as the data access plan 130 described above with reference to FIG. 1.

In act 604, the pattern matching component identifies a distinct data access method for each data source specified in the data access plan. In act 606, the pattern matching component identifies conditions that must be met by records within each data source for the records to be included in subsequent processing. Upon completion of the act 606, the pattern matching component terminates execution of the plan parsing method 600.

Methods such as the plan parsing method 600 enable pattern matching components to determine the information required to access data using concurrently executing threads.

As described above with reference to the act 504, some embodiments perform methods that assign a plurality of threads to execute a data access plan. One example of such a thread assignment method is illustrated in FIG. 7. According to this example, the thread assignment method 700 includes several acts which are described further below.

In act 702, a pattern matching component, such as the pattern matching component 102 described above with reference to FIG. 1, determines whether any data sources within a data access plan, such as the data access plan 130 described above with reference to FIG. 1, remain without at least one thread assigned to process the data source. If not, the pattern matching component terminates the thread assignment method 700. Otherwise, in act 704 the pattern matching component reads information descriptive of the next, unassigned data source in the order described in the data access plan.

In act 706, the pattern matching component determines whether the access method associated with the next, unassigned data source is an index-based access method. If so, the pattern matching component executes one or more index-based threads, such as the threads 120a, 120b, and 120n described above with reference to FIG. 1, on the next available processor within a multi-core processor, such as the multi-core processor 104 described above with reference to FIG. 1. Otherwise, the pattern matching component executes one or more scan-based threads, such as the threads 124a, 124b, and 124n described above with reference to FIG. 1, on the next available processor within the multi-core processor. In addition, the multi-core processor may include a plurality of multi-core processors and/or single core processors in a distributed system.

Methods such as the thread assignment method 700 enable pattern matching components to initiate concurrent, multi-threaded processing of data access methods, such as relational database queries.

Figure 8:
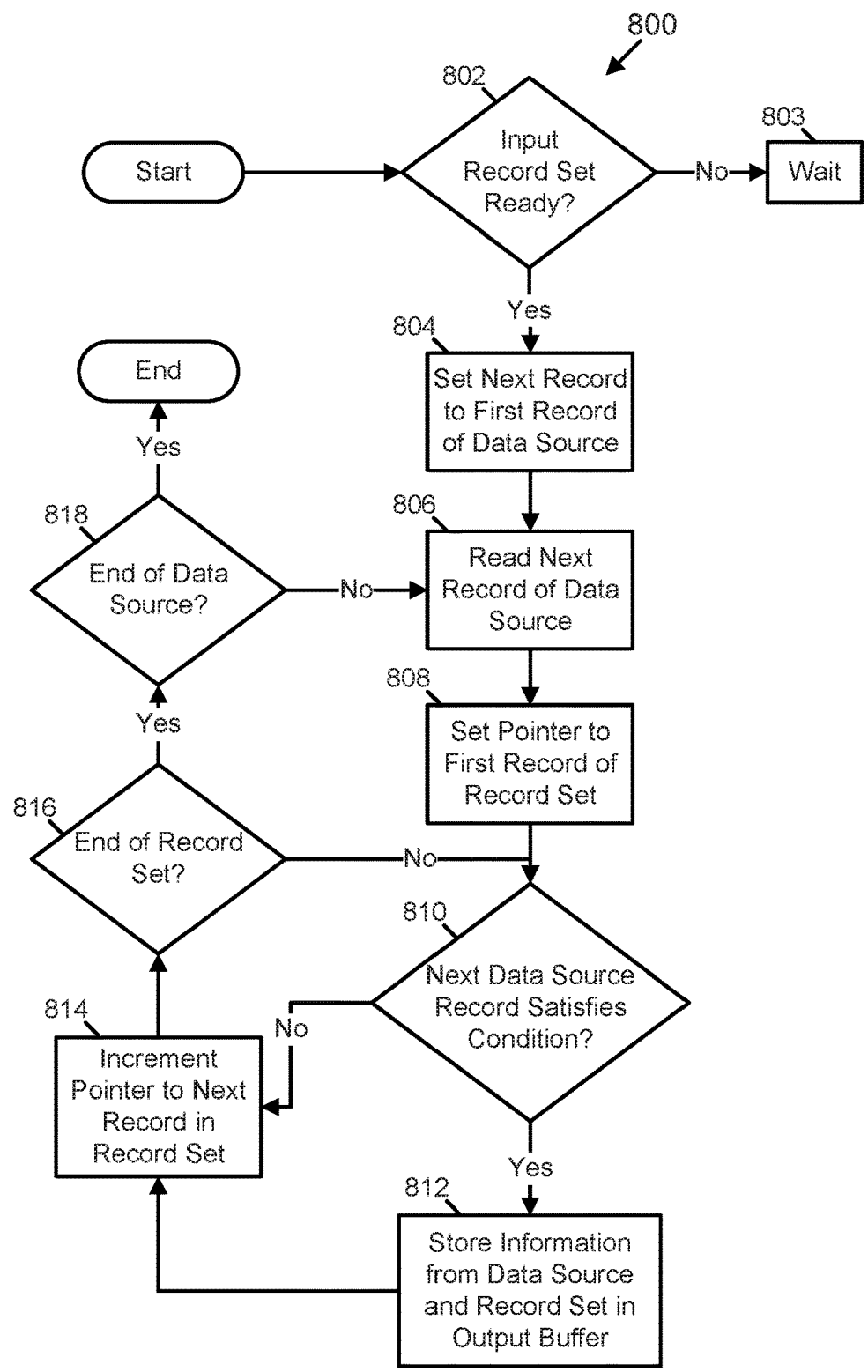
FIG. 8 is a flow diagram illustrating a method of executing an improved full scan method.

As described above with reference to the FIG. 1, some embodiments perform an improved full scan method. One example of such a full scan method is illustrated in FIG. 8. According to this example, the full scan method 800 includes several acts which are described further below.

In act 802, a scan-based thread, such as the thread 124a, 124b, or 124n described above with reference to FIG. 1, determines whether an input record set, such as may be stored in the buffer 122 described above with reference to FIGS. 1 and 9, is ready for processing (e.g., has either filled with records or processing of the previous data source is complete). If not, the scan-based thread waits predetermine period of time in act 803. Otherwise, the scan-based thread sets the next record of the data source being scanned, such as the data source 116 described above with reference to FIGS. 1 and 9, to the first record of the data source in act 804.

In act 806, the scan-based thread reads the next record of the data source. In act 808, the scan-based thread sets a pointer to the first record of the input record set. In act 810, the scan-based thread determines whether the next record of the data source satisfies the conditions associated with the data source. If so, in act 812, the scan-based thread retrieves information from the record pointed to in the input record set (i.e., without restoring the record from the input record set to the previous data source) and from the next record of the data source and stores the retrieved information in an output buffer, such as the buffer 126 described above with reference to FIGS. 1 and 9. Otherwise, the scan-based thread executes act 814.

In the act 814, the scan-based thread increments the pointer to the next record in the input record set. In the act 816, the scan-based thread determines whether the end of the input record set has been reached. If not, the scan-based thread executes the act 810. Otherwise, the scan-based thread determines whether the end of the data source being scanned has been reached in act 818. If not, the scan based thread executes the act 806. Otherwise, the scan-based thread determines whether a thread feeding the input buffer, such as the thread 120a, 120b, or 120n described above with reference to FIG. 1, has completed its processing. If so, the scan-based thread terminates the full scan method 800. Otherwise, the scan-based thread executes the act 802.

Methods such as the full scan method 800 enable threads to complete full scans of data sources more rapidly than conventional full scan methods, which restore data stored in processing buffers to the data source prior to processing subsequent data sources.

Methods 500 through 800 each depict one particular sequence of acts in a particular example. The acts included in these methods may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a data access system configured according to the examples and embodiments disclosed herein.

Having thus described several aspects of at least one embodiment, it is to be appreciated that various alterations, modifications, and improvements may be implemented therein. For instance, while portions of this disclosure relate to embodiments that work within a relational database system to execute a query execution plan, embodiments disclosed herein are not limited to pattern matching within a relational database system and may be used in other contexts to execute various types of data access plans. In addition, while some embodiments are implemented using multi-core processors, other embodiments may be implemented using a plurality of single core processors and/or multi-core processors. Further, while the bulk of this disclosure focuses on the use of threads to process information, other embodiments may use several, distinct software processes executed by the processor concurrently with one another to process information. Such alterations, modifications, and improvements are intended to be part of this disclosure, and are intended to be within the scope of the embodiments discussed herein. Accordingly, the foregoing description and drawings are by way of example only.

The invention claimed is:

1. A computer system configured to access related and distributed data, the computer system comprising:
    a memory including:
        at least one relational database including at least one first table and at least one second table;
        a query execution plan identifying the at least one first table and the at least one second table;
        at least one first buffer; and
        at least one second buffer; and
    at least one processor coupled to the memory and configured to execute the query execution plan at least in part by
        executing a first thread of executable instructions concurrently with a second thread of executable instructions;
        retrieving, via the first thread, first data from the at least one first table at least in part by
            identifying first records that meet at least one condition associated with the at least one first table; and
            retrieving the first data from the first records;
        retrieving, via the second thread, second data from the at least one first table at least in part by
            identifying second records that meet the at least one condition associated with the at least one first table; and
            retrieving the second data from the second records;
        storing, via the first thread, the first data in the at least one first buffer;
        storing, via the second thread, the second data in the at least one first buffer
        executing a third thread of executable instructions concurrently with a fourth thread of executable instructions;
        retrieving, from at least one second table in the relational database via the third thread, first records that meet at least one condition evaluated using third data stored in the at least one first buffer;
        retrieving, via the fourth thread, second records from the at least one second table that meet at least one condition evaluated using fourth data stored in the at least one first buffer;
        storing, via the third thread, data from the first records in at least one second buffer; and
        storing, via the fourth thread, data from the second records in the at least one second buffer, the first records being stored at a different location within the at least one first buffer from the second records.

2. A data access method executed by a computer system including at least one processor, the method comprising:
    executing a first thread of executable instructions concurrently with a second thread of executable instructions;
    retrieving, via the first thread, first data from at least one first table in a relational database at least in part by
        identifying first records that meet at least one condition associated with the at least one first table; and
        retrieving the first data from the first records;
    retrieving, via the second thread, second data from the at least one first table at least in part by
        identifying second records that meet the at least one condition associated with the at least one first table; and retrieving the second data from the second records;
storing, via the first thread, the first data in at least one first buffer;
storing, via the second thread, the second data in the at least one first buffer;
executing a third thread of executable instructions concurrently with a fourth thread of executable instructions;
retrieving, from at least one second table in the relational database via the third thread, first records that meet at least one condition evaluated using third data stored in the at least one first buffer;
retrieving, via the fourth thread, second records from the at least one second table that meet at least one condition evaluated using fourth data stored in the at least one first buffer;
storing, via the third thread, data from the first records in at least one second buffer; and
storing, via the fourth thread, data from the second records in the at least one second buffer, the first records being stored at a different location within the at least one first buffer from the second records.

3. A non-transitory computer readable medium having a program stored therein to access related and distributed data, the program being executable by a computer system including at least one processor, at least one first buffer and at least one second buffer, the program comprising:
instructions to execute a first thread of executable instructions concurrently with a second thread of executable instructions, wherein
the first thread comprises
executable instructions to retrieve first data from at least one first table in a relational database at least in part by
identifying first records that meet at least one condition associated with the at least one first table; and
retrieving the first data from the first records; and
executable instructions to store the first data in at least one first buffer; and
the second thread comprises
executable instructions to retrieve second data from the at least one first table at least in part by
identifying second records that meet the at least one condition associated with the at least one first table; and
retrieving the second data from the second records; and
executable instructions to store the second data in the at least one first buffer; and
instructions to execute a third thread of executable instructions concurrently with a fourth thread of executable instructions, wherein
the third thread comprises
executable instructions to retrieve, from at least one second table in a relational database, first records that meet at least one condition evaluated using third data stored in the at least one first buffer; and
executable instructions to store data from the first records in at least one second buffer; and
the fourth thread comprises
executable instructions to retrieve second records from the at least one second table that meet at least one condition evaluated using fourth data stored in the at least one first buffer; and
executable instructions to store data from the second records in the at least one second buffer, the first records being stored at a different location within the at least one first buffer from the second records.

4. The computer system of claim 1, wherein the at least one processor is configured to provide a result from execution of the query execution plan to a component that generated the query execution plan.

5. The method of claim 2, further comprising:
retrieving, via the third thread, the third data from the at least one first buffer in a round-robin fashion; and
retrieving, via the fourth thread, the fourth data from the at least one first buffer in a round-robin fashion.

6. The method of claim 2, further comprising parsing a query execution plan to identify an order of processing indicating the at least one first table be processed prior to the at least one second table.

7. The computer readable medium of claim 3, the program further comprising:
instructions to execute the first thread concurrently with the second thread via a first processing core of a multi-core processor; and
instructions to execute the third thread concurrently with the fourth thread via a second processing core of the multi-core processor.

8. The computer readable medium of claim 3, the third thread further comprising executable instructions to retrieve the third data from the at least one first buffer in a round-robin fashion and the fourth thread further comprising executable instructions to retrieve the fourth data from the at least one first buffer in a round-robin fashion.

9. The computer readable medium of claim 3, the program further comprising instructions to parse a query execution plan to identify an order of processing indicating the at least one first table be processed prior to the at least one second table.

10. The computer readable medium of claim 9, the program further comprising instructions to provide a result from execution of the query execution plan to a component that generated the query execution plan.

11. The computer system of claim 4, wherein the at least one processor includes a first processing core and a second processing core within a multi-core processor and the first processing core is configured to execute the first thread concurrently with the second thread and the second processing core is configured to execute the third thread concurrently with the fourth thread.

12. The computer system of claim 4, wherein the at least one processor is further configured to execute the query execution plan at least in part by retrieving, via the third thread, the third data from the at least one first buffer in a round-robin fashion and retrieving, via the fourth thread, the fourth data from the at least one first buffer in a round-robin fashion.

13. The computer system of claim 4, wherein the at least one processor is further configured to execute the query execution plan at least in part by parsing the query execution plan to identify an order of processing indicating the at least one first table be processed prior to the at least one second table.

14. The method of claim 6, further comprising providing a result from execution of the query execution plan to a component that generated the query execution plan.

* * * * *